(12) United States Patent  (10) Patent No.: US 8,353,477 B2
Mayer et al.  (45) Date of Patent: Jan. 15, 2013

(54) DEVICE FOR THE IMPROVEMENT OF INDIVIDUAL COMFORT IN AN AIRPLANE

(75) Inventors: Erhard Mayer, Holzkirchen (DE); Andreas Holm, Weyarn (DE); Gunnar Gruen, Valley (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 560 days.

(21) Appl. No.: 12/301,898

(22) PCT Filed: May 23, 2007

(86) PCT No.: PCT/EP2007/004594
§ 371 (c)(1),
(2), (4) Date: Nov. 21, 2008

(87) PCT Pub. No.: WO2007/134858
PCT Pub. Date: Nov. 29, 2007

(65) Prior Publication Data
US 2011/0057072 A1 Mar. 10, 2011

(30) Foreign Application Priority Data
May 24, 2006 (DE) .......................... 10 2006 024 383

(51) Int. Cl.
*B64D 11/00* (2006.01)
(52) U.S. Cl. ................. 244/118.5; 244/118.6; 244/17.17
(58) Field of Classification Search ............... 244/118.5, 244/118.6, 17.27, 147, 17.17; 359/361; 310/328; 430/95; 165/49; 62/94
See application file for complete search history.

(56) References Cited

U.S. PATENT DOCUMENTS

| | | | | |
|---|---|---|---|---|
| 3,330,506 A | * | 7/1967 | Robillard et al. | 244/118.5 |
| 3,370,813 A | * | 2/1968 | Albertine et al. | 244/118.5 |
| 3,492,934 A | | 2/1970 | Steigerwald | |
| 3,690,606 A | * | 9/1972 | Pall | 428/605 |
| 3,783,935 A | * | 1/1974 | Simmons et al. | 165/44 |
| 3,783,969 A | * | 1/1974 | Pall | 181/286 |
| 4,409,311 A | * | 10/1983 | Kawamura et al. | 430/95 |
| 4,819,548 A | | 4/1989 | Horstman | |
| 4,870,895 A | * | 10/1989 | Mayer | 454/120 |
| 5,651,733 A | | 7/1997 | Schumacher | |
| 5,688,592 A | * | 11/1997 | Shibahashi et al. | 428/323 |

(Continued)

FOREIGN PATENT DOCUMENTS

DE 1 778 570 3/1972

(Continued)

OTHER PUBLICATIONS www.sunelectricheater.com; "SunRod" Mini Cartridge Heaters, Sun Electric Heater Company; Nov. 11, 2000.*

(Continued)

*Primary Examiner* — Christopher P Ellis
*Assistant Examiner* — Medhat Badawi
(74) *Attorney, Agent, or Firm* — Greenblum & Bernstein, P.L.C.

(57) ABSTRACT

A device and method for increasing comfort in an aircraft. The device and method utilizes a surface arranged between a ceiling paneling of a cabin of the aircraft and a passenger. The surface is arranged to face the passenger and is positionable so that a distance between the surface and the passenger is changeable. The device is structured and arranged to at least one of affect a thermal comfort of the passenger and supply air to the passenger via the surface.

23 Claims, 3 Drawing Sheets

U.S. PATENT DOCUMENTS

| | | | | |
|---|---|---|---|---|
| 6,090,513 | A * | 7/2000 | Niino et al. | 430/65 |
| 6,104,530 | A * | 8/2000 | Okamura et al. | 359/359 |
| 6,307,671 | B1 * | 10/2001 | Yabuki | 359/361 |
| 6,413,159 | B1 | 7/2002 | Bates, III | |
| 6,481,222 | B1 * | 11/2002 | Denniston | 62/94 |
| 6,719,623 | B1 * | 4/2004 | Kodaveridan et al. | 454/76 |
| 6,775,059 | B2 * | 8/2004 | Kuwabara | 359/359 |
| 7,323,808 | B2 * | 1/2008 | Kim et al. | 313/44 |
| 2002/0101135 | A1 * | 8/2002 | Giovanardi et al. | 310/328 |
| 2003/0131969 | A1 * | 7/2003 | Harata et al. | 165/49 |
| 2004/0256520 | A1 | 12/2004 | Guard et al. | |
| 2006/0022087 | A1 * | 2/2006 | Defilla et al. | 244/118.5 |
| 2006/0105175 | A1 * | 5/2006 | Otani et al. | 428/411.1 |
| 2007/0013998 | A1 * | 1/2007 | Wu et al. | 359/361 |
| 2008/0056526 | A1 * | 3/2008 | Dunn et al. | 381/380 |
| 2008/0110262 | A1 * | 5/2008 | Ariav et al. | 73/598 |
| 2008/0273240 | A1 * | 11/2008 | Danzebrink et al. | 359/359 |
| 2008/0274012 | A1 * | 11/2008 | Cumberland et al. | 422/4 |
| 2009/0120614 | A1 * | 5/2009 | Lin et al. | 165/100 |
| 2010/0208337 | A1 * | 8/2010 | Uehara et al. | 359/359 |
| 2010/0225988 | A1 * | 9/2010 | Kalkanoglu et al. | 359/267 |

FOREIGN PATENT DOCUMENTS

| | | |
|---|---|---|
| DE | 36 05 539 A1 | 8/1987 |
| DE | 195 02 658 C1 | 3/1996 |
| DE | 100 27 925 | 12/2001 |
| DE | 10 2004 018 737 | 11/2005 |
| EP | 0 292 033 A2 | 11/1988 |
| EP | 1 167 184 A2 | 1/2002 |
| GB | 1 204 594 A | 9/1970 |
| WO | WO 99/48756 | 9/1999 |

OTHER PUBLICATIONS

Publication entitled "Taschenbuch für Heizung+Klima Technik 2000" by Recknagel, Sprenger Schramek (15 sheets).

* cited by examiner

DEVICE FOR THE IMPROVEMENT OF INDIVIDUAL COMFORT IN AN AIRPLANE

CROSS-REFERENCE TO RELATED APPLICATIONS

The present application is a U.S. National Stage of International Patent Application No. PCT/EP2007/004594 filed May 23, 2007 which published as WO 2007/134858 on Nov. 29, 2007, and claims priority of German Patent Application No. 10 2006 024 383.8 filed May 24, 2006.

BACKGROUND OF THE INVENTION

1. Field of the Invention

The invention relates to a device and method for increasing the thermal comfort and reducing health related problems in an aircraft.

2. Discussion of Background Information

In order to make flying pleasant for the passengers and to protect their health, considerable expense is dedicated to creating comfortable conditions in passenger aircraft. An important factor is a pleasant climate. Adequate fresh air must thereby be provided. In particular, the air in the aircraft must not exceed a predetermined $CO_2$ level. Moreover, a pleasant temperature and an adequate humidity of the air in the aircraft cabin must be ensured. As a rule, air is blown into the passenger cabin from the ceiling of the passenger cabin. To this end, outside air that is suctioned in is treated accordingly. Moreover, the outside air can be mixed with a proportion of recirculated air that must be treated likewise. In order that an excessively high $CO_2$ level is not reached through the addition of recirculated air, in WO99/48756 it was proposed to use a $CO_2$ sensor. As a rule, the passenger cabin must be cooled. On the one hand, a heating takes place through the high solar radiant exposure. If a passenger cabin is well occupied, a not insubstantial heating also takes place through the passengers themselves. For cooling, outside air suctioned in, which is cold, is inserted into the passenger cabin. This air is not only cold, but also very dry. Moisture must therefore be added. To this end, it is necessary to add water to the inlet air. This water must be carried along and leads to additional weight, which increases fuel costs. Another problem is that passengers have different preferences in terms of temperature and humidity. The previous central ventilation hardly allows passengers' individual preferences to be taken into account. This also relates to passengers' individual preferences regarding lighting, noise protection and other factors that influence comfort. For the individual adjustment of the ventilation, it is known from U.S. Pat. No. 6,719,623 B1 to utilize a nozzle located on the ceiling such that its direction and the volume flow can be adjusted by the passenger. Although this means that individual preferences can thereby be taken into account, the adjacent passenger is also affected by a nozzle on the ceiling. The high air speed usually leads to draught problems. A device is known from US 2006/0022087 A1, which is used so that the aircraft crew can rest. This device has a ceiling, the distance of which from the person resting therein can be adjusted. The comfort of the person resting can thus be influenced. It is known from DE 195 02 658 C1 to utilize a supply unit located above the passenger, which has, i.e., air nozzles. This supply unit can be moved to load the baggage stowage arranged above the passenger. However, individual preferences of the passengers regarding lighting, noise protection and other factors that influence comfort cannot be taken into account therewith in a targeted manner.

SUMMARY OF THE INVENTION

The invention aims to overcome the disadvantages of the prior art and to provide a device which makes it possible to adjust for the passengers as individually as possible important characteristics for the comfort of passengers, in particular, the air-conditioning characteristics.

The invention also provides for a device for increasing comfort in an aircraft, wherein the device comprises a surface arranged between a ceiling paneling of a cabin of the aircraft and a passenger. The surface is arranged to face the passenger and is positionable so that a distance between the surface and the passenger is changeable. The device is structured and arranged to affect a thermal comfort of the passenger and supplying air to the passenger via the surface.

The supplied air can have desired properties and can be distributed over an enlarged area. The desired properties may include at least one of a desired temperature and a desired humidity. The surface may have a high absorption coefficient. The high absorption coefficient may be greater than 0.8 for thermal radiation. The thermal radiation may have a wavelength range of 750 nm to 1 mm.

The device may further comprise an illumination arrangement for providing illumination to at least one of the passenger and an area in front of the passenger. The device may further comprise a sound damper arrangement for providing one of active sound dampening and passive sound damper. The device may further comprise an electrical heating arrangement for providing heating.

The surface may be curved towards the ceiling paneling. The surface may be one of structured and arranged to guarantee a free view in a longitudinal direction of the aircraft cabin and has at most small or no areas, a perpendicular of which, forms an angle of less than 30° with the longitudinal direction of the aircraft cabin. The surface may be bell shaped. The surface may be approximately half a square meter in size.

The device may further comprise an oxygen mask for supplying oxygen to the passenger.

The surface may be positionable so that a distance between the surface and the passenger is increased without involvement of the passenger.

The invention also provides a device for increasing passenger comfort in an aircraft, wherein the device comprises a surface arranged between a ceiling paneling of a cabin of the aircraft and a passenger. The surface is adjustably movable so that a distance between the surface and the passenger is changeable. The device may be structured and arranged to affect a temperature and humidity of the air supplied to the passenger via the surface.

The invention also provides for a method for increasing passenger comfort in an aircraft using a surface arranged between a ceiling paneling of a cabin of the aircraft and a passenger, wherein the method comprises changing a distance between the surface and the passenger and supplying air to the passenger via the surface to affect a thermal comfort of the passenger.

The supplying may comprise supplying the air with desired properties and over an enlarged area. The desired properties may include at least one of a desired temperature and a desired humidity. The method may further comprise one of providing illumination to at least one of the passenger and an area in front of the passenger, providing one of active sound dampening and passive sound damper, and providing heating using an electrical heating arrangement. The surface may be curved towards the ceiling paneling and the surface may be approximately half a square meter in size.

BRIEF DESCRIPTION OF THE DRAWINGS

The following are brief descriptions of the drawings of the instant application, wherein.

DETAILED DESCRIPTION OF THE PRESENT INVENTION

Figure 1:
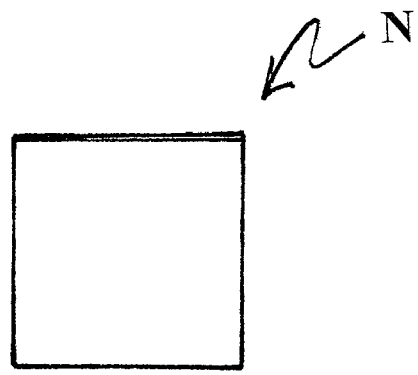
FIG. 1 schematically shows a prior art nozzle.
Figure 2:
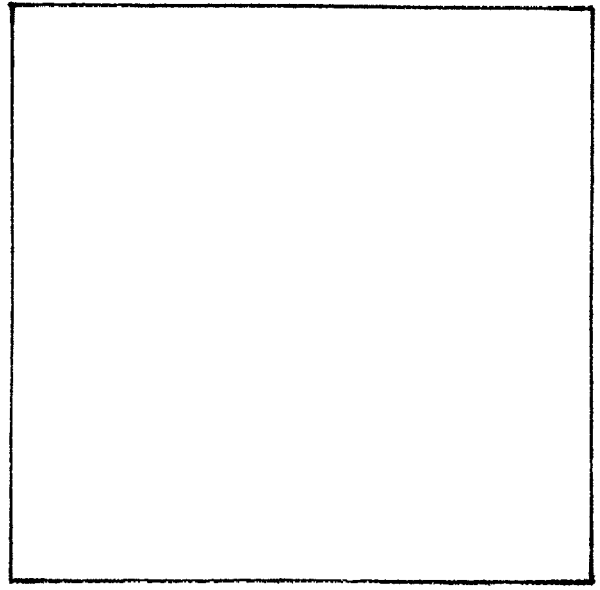
FIG. 2 schematically shows an air supplying surface having a larger surface area than a nozzle in accordance with the invention.
Figure 3:
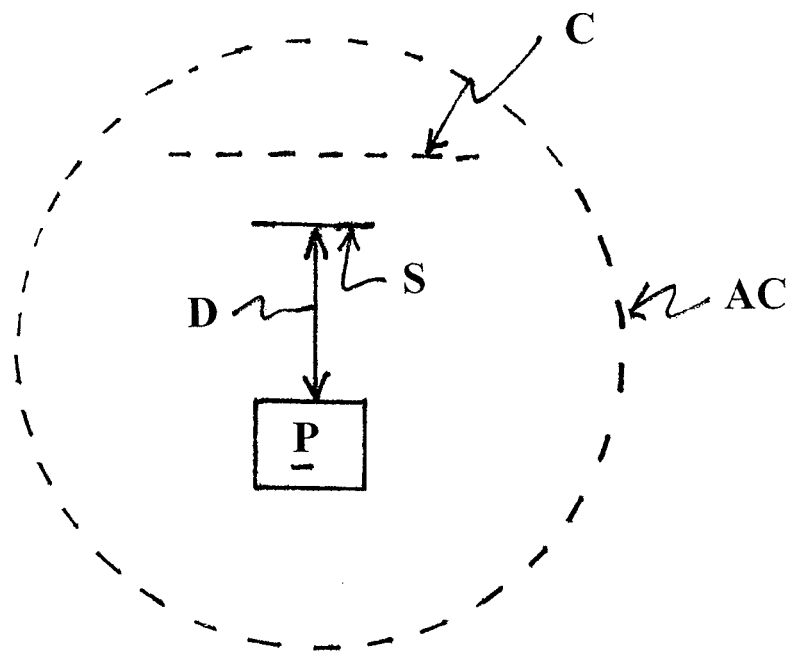
FIG. 3 schematically shows a cross-section of an aircraft cabin having a ceiling, a floor, a passenger and an air supplying surface whose position change in accordance with the invention.
Figure 4:
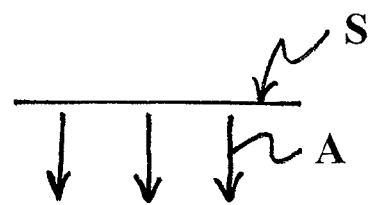
FIG. 4 schematically shows the air supplying surface of FIGS. 2 and 3 supplying air represented by arrows in accordance with the invention.
Figure 6:
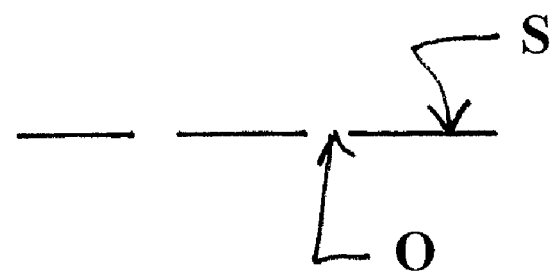
FIG. 6 schematically shows the air supplying surface of FIGS. 2 and 3 with openings in accordance with the invention.

A device is proposed for increasing the comfort in an aircraft. The device includes an air supplying surface S as shown in FIG. 2 which is larger in surface area than a nozzle N as shown in FIG. 1. As shown in FIG. 4, the surface S supplies air A as indicated by arrows. As shown in FIG. 6, this can occur via openings O in the surface S. In FIG. 3 it can be seen that the surface S is arranged between the ceiling C or ceiling paneling of the aircraft cabin AC and a passenger P. The surface S faces the passenger. The distance D between the surface S and the passenger P is changeable. The device is designed such that, in particular, thermal comfort of the passenger can be affected. A more precise definition of the term comfort is found in "Taschenbuch für Heizung+Klima Technik 2000" by Recknagel, Sprenger Schramek, pages 50 through 75. These pages expressly form a constituent part of the instant disclosure. To sum up briefly, comfort is given in a range, the so-called comfort range, in which a person feels most comfortable. There are no fixed limits for this range. Instead, it depends on the individual person. For the thermal comfort focused on here, in addition to clothing and physical activity, the following are important: the air temperature and the uniformity of the same, the air humidity, the air movement and the temperatures of the surrounding surfaces.

The proposed device makes it possible to influence the comfort of the respective passenger individually. The degree of influence is high due to a small distance between the passenger and the surface facing the passenger. An adjustable spacing thus has the advantage that a small distance is selected only when the passenger also wishes it. For example, when the passenger wants to stand up, the distance between the surface facing the passenger and the passenger must be selected to be higher. However, if the passenger wants to profit from the effect through the device, such as when he wants more air to be fed, the distance between the surface facing the passenger and the passenger must be selected to be small. Providing a surface makes it possible to shield the passenger from the effects of the passenger cabin, e.g., draughts, brightness or noise. TV monitors or the like can also be attached to or integrated into the surface. The change of the distance can be carried out mechanically by the passenger. However, a motor drive, as a rule an electric drive, is also possible, which can be operated by the passenger. A control panel can be provided, for example, in the seat back.

In addition, the device has installations with which the passenger can be supplied through the surface with air, in particular, air with desired properties, such as desired temperature and/or desired humidity. This means that the passenger has in his field of vision chiefly air from the device mixed with the air that he exhales. The air exchange can be reduced in the area that is located immediately in front of the passenger's face. Thus, a higher proportion of the air exhaled by the passenger is present in the air in front of his field of vision. This air is humidified by the passenger's breathing. The moisture to be supplied can thus be reduced. Less water needs to be carried along to humidify the air. The removal of the vitiated air can be carried out as usual at discharge ducts attached laterally on the floor. An airflow is thus produced from the surface of the device past the passenger onto the floor and subsequently a flow on the floor to the discharge ducts. The air supplied can be taken from an air supply system located in the ceiling. Of course, it is still possible and expedient to also supply air to the passenger cabin via the ceiling conventionally, such as above the aisles. As a rule, the temperature should be lower in the aisles than in the seats, since the crew move in the aisles and want a lower temperature than the seated passengers. To this end, it is expedient to provide centrally cooled air in the ventilation system that then can be individually heated depending on the requirements of the individual passenger. Another advantage of the distribution of the air over the surface that is facing the passenger results from the fact that due to this large-area distribution the passenger is exposed to only a weak air movement, and not an annoying draught. The same air mass flow rate can take place during the flowing-out over a large area at low speed. With the known nozzles an annoying draught is frequently unavoidable. This annoying draught is to be avoided by utilizing a large-area distribution. In order to distribute air over a large area, a surface with many holes is necessary, through which the air can flow. The distance between the holes should thereby be as small as possible and not exceed a maximum of 5 cm. A very small distance in the range of a few millimeters is ideal. For example, a plexiglass with many small holes spaced apart by a few millimeters can thus be used. A suitable embodiment is an air-permeable textile fabric. To the extent that it is appropriate to still speak of holes with a textile fabric, the spacing thereof is often less than one millimeter. A textile fabric can also serve as a filter for the air supplied at the same time. Through the low speed of the air flowing through already mentioned, the flow-through resistance can be kept low. Furthermore, through the proposed device, the inhalation of air that comes from the area of adjacent passengers is avoided. This reduces the danger of the transfer of infectious diseases. A possible exposure to unpleasant smells is also reduced.

In an advantageous further development, the surface has a high absorption coefficient, preferably an absorptive capacity of greater than 0.8 for thermal radiation, in particular, for thermal radiation in a wavelength range of 750 nm to 1 mm. In this manner, it is possible for the passenger to feel a temperature radiation that is pleasant to him. For example, if the passenger wants cooling, the radiation emitted by him to the surface is absorbed there. Due to the low temperature of the surface, only a weaker temperature radiation is radiated back to the passenger. As is well known, the absorption coefficient and emissivity for the same wavelength agree. If the passenger would like to be exposed to a greater thermal radiation, this can be carried out through a correspondingly hot surface, which supplies the passenger with radiation. We refer for the details to "Taschenbuch für Heizung+Klima Technik 2000" by Recknagel, Sprenger Schramek, pages 53-57.

If the device has installations that render possible an illumination of the passenger and/or the area in front of the passenger, each passenger can obtain the individually desired degree of brightness, without other passengers being exposed to the same brightness. In particular, with long-haul flights on which the passengers want time to sleep, this is a clear advantage. Moreover, the passenger can be radiated with a desired color that can be individually adjusted. The comfort depending on the color can thus also be improved. Furthermore, the illumination can be adapted to the circadian rhythm of the passengers through suitable color selection, thus making it easier to overcome jet lag.

It is also conceivable to embody the above-referenced device as a sound damper, i.e., to ensure a damping of sound on the surface facing the passenger. It is thus quieter for the passenger. With suitable devices, preferably loudspeakers that generate antiphase sound to the flight noise, active sound damping can also be provided, through which the noise level in the aircraft can be reduced according to individual preferences. Through the installation of the sound damping devices and the loudspeaker devices on the surface facing the passenger, the individual preferences of the individual passengers can be satisfied without neighboring passengers being excessively impacted.

It is favorable if the device can be electrically heated. It is thus possible to electrically heat the air to be supplied to the passenger. As already mentioned, in the central air supply for the passenger cabin cool air can be thus provided which can be heated according to the individual preferences of the passengers. The surface facing the passenger can also be heated through the electric heating, whereby the above-mentioned greater thermal radiation can be achieved.

Figure 5:
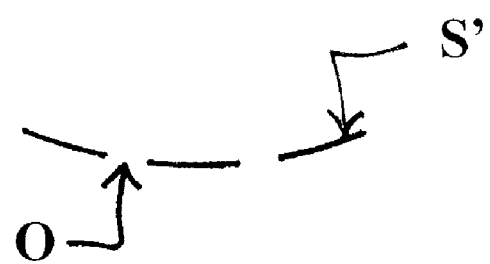
FIG. 5 schematically shows an air supplying surface with openings and being curved toward the ceiling in accordance with the invention.

Preferably the surface S' facing the passenger is embodied such that it is curved towards the ceiling and has openings (see FIG. 5). A large surface can thus face the passenger, without him feeling constricted. Moreover, the impact of the surface on the adjacent passenger can thus be reduced.

One embodiment provides that to guarantee a free view in the longitudinal direction of the aircraft cabin, the surface has at the most small, preferably no areas, the perpendicular of which forms an angle of less than 30° with the longitudinal direction of the aircraft cabin. This is achieved, for example, if the surface has a semitubular shape curved towards the ceiling. A device exclusively designed to improve the air conditioning would also provide surfaces that stand perpendicular to the flight direction. However, this would restrict the free view in the cabin, which could give the passengers a subjective feeling of oppression. This may be undesirable, in particular, with regard to the objectively restricted conditions in an aircraft.

An optimal air conditioning is achieved by the surface being embodied like a bell. This can be quasi placed over the passenger.

It is favorable when the surface has a size of approx. half a square meter.

The device should be designed such that, if necessary, the passenger can be supplied with an oxygen mask. It has hitherto been customary for oxygen masks, which are necessary in emergencies, to be supplied to the passenger from the ceiling. The device presented here might impede this. The function of the provision of an oxygen mask should therefore be integrated into the device.

In a further development, it is provided that the distance between the surface and the passenger can be increased without involvement of the passenger. It is thus possible to meet any safety requirements that require a free headroom for the passenger in certain flight situations, for instance upon take-off or landing.

The invention claimed is:

1. A device for increasing comfort in an aircraft, the device comprising:
    an air supplying surface arranged between a ceiling paneling of a cabin of the aircraft and a passenger;
    the surface comprises an air discharge area having plural openings through which air can flow, said air discharge area comprising a larger area than an aircraft ceiling air nozzle; and
    the surface being arranged to face the passenger and being positionable so that a distance between the surface and the passenger is changeable,
    wherein the device is structured and arranged to at least one of affect a thermal comfort of the passenger and supply air to the passenger via the surface, and
    wherein the surface is one of:
        structured and arranged to guarantee a free view in a longitudinal direction of the aircraft cabin; and
        has at most small or no areas, a perpendicular of which, forms an angle of less than 30° with the longitudinal direction of the aircraft cabin.

2. The device of claim 1, wherein the supplied air has desired properties and is distributed over an enlarged area.

3. The device of claim 2, wherein the desired properties include at least one of a desired temperature and a desired humidity.

4. The device of claim 1, wherein the surface has a high absorption coefficient.

5. The device of claim 4, wherein the high absorption coefficient is greater than 0.8 for thermal radiation.

6. The device of claim 5, wherein the thermal radiation has a wavelength range of 750 nm to 1 mm.

7. The device of claim 1, further comprising an illumination arrangement for providing illumination to at least one of the passenger and an area in front of the passenger.

8. The device of claim 1, further comprising a sound damper arrangement for providing one of active sound dampening and passive sound damper.

9. The device of claim 1, further comprising an electrical heating arrangement for providing heating.

10. The device of claim 1, wherein the surface is curved towards the ceiling paneling.

11. The device of claim 1, wherein the surface is bell shaped.

12. The device of claim 1, wherein the surface is approximately half a square meter in size.

13. The device of claim 1, further comprising an oxygen mask for supplying oxygen to the passenger.

14. The device of claim 1, wherein the surface is positionable so that a distance between the surface and the passenger is increased.

15. A device for increasing passenger comfort in an aircraft, the device comprising:
    an air supplying surface having a high absorption coefficient being arranged between a ceiling paneling of a cabin of the aircraft and a passenger;
    the surface comprises an air discharge area having plural openings through which air can flow, said air discharge area comprising a larger area than an aircraft ceiling air nozzle; and the surface being adjustably movable so that a distance between the surface and the passenger is changeable, wherein the device is structured and arranged to affect a temperature and humidity of the air supplied to the passenger via the surface.

16. A method for increasing passenger comfort in an aircraft using an air supplying surface arranged between a ceiling paneling of a cabin of the aircraft and a passenger, the method comprising:

changing a distance between the surface and the passenger; and supplying air to the passenger via the surface to affect a thermal comfort of the passenger, wherein the surface comprises an air discharge area having plural openings through which air can flow, said air discharge area comprising a larger area than an aircraft ceiling air nozzle, and wherein the surface is one of:
structured and arranged to guarantee a free view in a longitudinal direction of the aircraft cabin; and
has at most small or no areas, a perpendicular of which, forms an angle of less than 30° with the longitudinal direction of the aircraft cabin.

17. The method of claim 16, wherein the supplying comprises supplying the air with desired properties and over an enlarged area.

18. The method of claim 17, wherein the desired properties include at least one of a desired temperature and a desired humidity.

19. The method of claim 16, further comprising one of:
providing illumination to at least one of the passenger and an area in front of the passenger;
providing one of active sound dampening and passive sound damper; and
providing heating using an electrical heating arrangement.

20. The method of claim 16, wherein one of:
the surface is curved towards the ceiling paneling; and
the surface is approximately half a square meter in size.

21. The method of claim 16, wherein one of:
the surface is a planar surface;
the surface area is a curved surface; and
a temperature and/or humidity of air from the surface is adjustable by the passenger.

22. The device of claim 15, wherein one of:
the surface is a planar surface;
the surface area is a curved surface; and
a temperature and/or humidity of air from the surface is adjustable by the passenger.

23. The device of claim 1, wherein each of:
a temperature and/or humidity of air from the surface is adjustable by the passenger; and
one of:
the surface is a planar surface; and
the surface area is a curved surface.

* * * * *